United States Patent [19]

Miura

[11] Patent Number: 6,081,831
[45] Date of Patent: Jun. 27, 2000

[54] ELECTRONIC MAIL APPARATUS AND A METHOD FOR OPERATING THE SAME

[75] Inventor: Kiyotaka Miura, Yokohama, Japan

[73] Assignee: Canon Kabushiki Kaisha, Tokyo, Japan

[21] Appl. No.: 08/885,178

[22] Filed: Jun. 30, 1997

[30] Foreign Application Priority Data

Jul. 17, 1996 [JP] Japan ................................ 8-187856

[51] Int. Cl.[7] .......................... G06F 13/38; G06F 15/17
[52] U.S. Cl. ......................... 709/206; 709/207; 709/203
[58] Field of Search .................................. 707/527, 526; 709/206, 207, 203

[56] References Cited

U.S. PATENT DOCUMENTS

| | | | |
|---|---|---|---|
| 5,754,873 | 5/1998 | Nolan | 707/527 |
| 5,765,178 | 6/1998 | Tanaka | 707/526 |

OTHER PUBLICATIONS

Graphical correspondence in electronic–mail networks using personal computers, Jen C. ArabakIEEE, 1989.

Requirement analysis for next generation electronic mail systems. S.C. Hui, S.Foo and C.J.Daray, Division of computer technology schoo; of applied science Nanyang technological University Singapore 2263.

*Primary Examiner*—Zarni Maung
*Assistant Examiner*—Mahmanzar Moezzi
*Attorney, Agent, or Firm*—Fitzpatrick, Cella, Harper & Scinto

[57] ABSTRACT

In order to make a display of a mail text easy to observe, the size of characters assigned in the mail text is checked, and if the size is not within a predetermined allowable range, the text is displayed on a display device using a font such that the size of characters is within the allowable range. A similar processing is also performed when reproducing voice information added to a mail text.

21 Claims, 6 Drawing Sheets

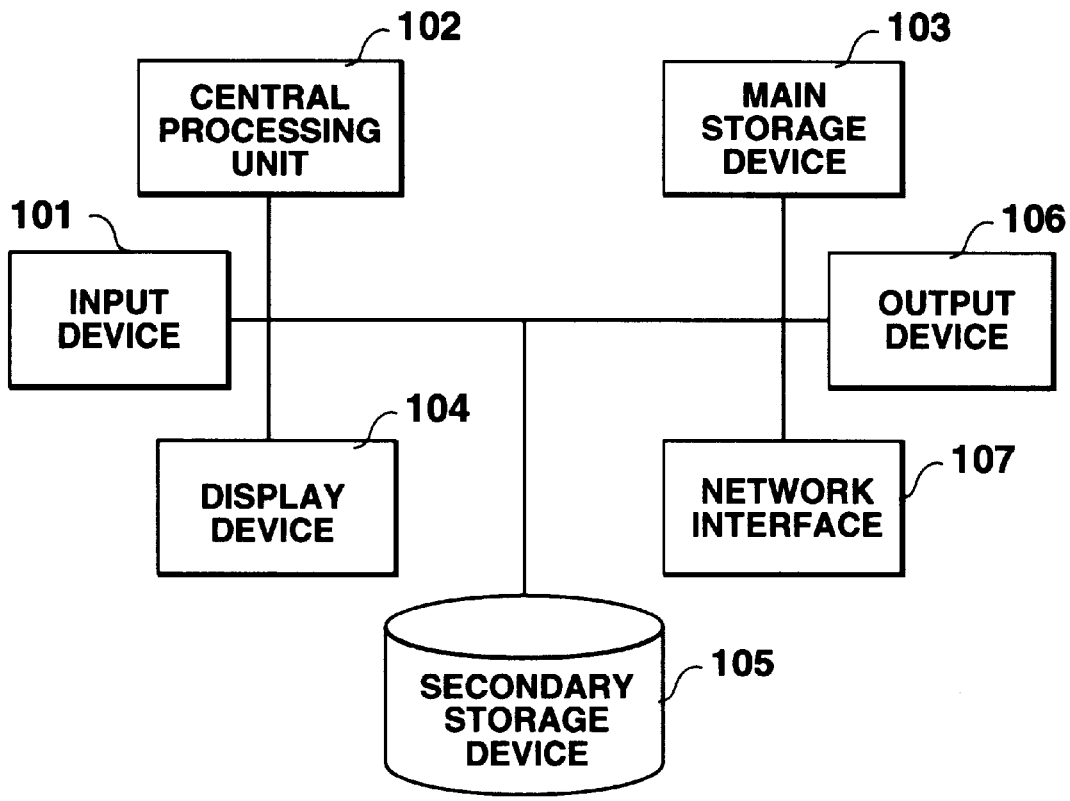

FIG.4

{\rtf0\ansi{\fonttbl\f0\fnil GothicBBBHelvetica;}
\paperw13040
\paperh10800
\margl120
\margr120
\pard\tx620\tx1240\tx1860\tx2480\tx3100\tx3720\tx4340\tx4980\tx5600\tx6220\f0\b0\i0\ulnone\fs36\fc0\cf0 HOW DO YOU DO ?
\fs20 I AM ONO JUST JIONING THIS OFFICE.\
I AM GLAD TO MAKE YOUR ACQUAINTANCE.
MY MAIL ADDRESS AND TELEPHONE NUMBER
ARE AS FOLLOWS:
\fs28\
MAIL : ono @ppp.xxx.co.jp\
TELEPHONE NUMBER : 3705
}

ELECTRONIC MAIL APPARATUS AND A METHOD FOR OPERATING THE SAME

BACKGROUND OF THE INVENTION

1. Field of the Invention

This invention relates to an electronic mail apparatus which is connected to a signal line for communication and which can perform transmission/reception of a document with a communication partner. More particularly, the invention relates to an electronic mail apparatus which is suitable when operating software for electronic mail in a personal computer, a work station or the like, and to a method for operating such an apparatus.

2. Description of the Related Art

As communication networks have been developed, and personal computers and work stations have been widely used, electronic mail systems operating on a communication network have been widely used. In an earlier stage of electronic mail, only text data have been transmitted and received. Recently, however, a standard named MIME (Multipurpose Internet Mail Extensions) has been provided, and a letter (mail) in which image data and voice data are added to a text can also be transmitted and received. Multipart mail bodies are also included in the standard. If the transmitter determines the size of characters (a font) in a character string of a mail sentence and information relating to the size is included in the mail sentence, the receiver can reproduce characters of the same size based on the size information.

Accordingly, in an electronic mail apparatus which uses such a communication standard for assigning font sizes, if the transmitter forms a main text with a character string of a small font size, the receiver is forced to reproduce the text with a character string of the small font size. For electronic mail, a format for transmitting/receiving a text having voice/sound data added thereto is also provided, so that such a text can be transmitted/received. In this case, also, the sound volume of voice/sound data depends on sound data formed by the transmitter.

SUMMARY OF THE INVENTION

It is an object of the present invention to provide an electronic mail apparatus and method which provides a display suitable for the user by changing the size of characters of a mail.

It is another object of the present invention to provide an electronic mail apparatus and method which provides a voice output suitable for the user by changing the level of reproduced voice assigned by a mail.

According to one aspect, the present invention which achieves these objectives relates to an electronic mail apparatus including an interface device for connecting the apparatus to a network, a reception device for receiving a character string via the interface device, a storage device for storing range information indicating an allowable range for character sizes, a determination device for determining, when character-size information for assigning a character size is added to the character string received by the reception device, if the character size assigned by the added character-size information is within the allowable range indicated by the range information, a changing device for changing the character-size information into information for assigning a character size within the allowable range when the determination device has determined that the character size is not within the allowable range, and a display device for displaying the character string received by the reception device based on the character-size information changed by the changing device.

According to another aspect, the present invention which achieves these objectives relates to an electronic mail apparatus including an interface device for connecting the apparatus to a network, a reception device for receiving voice information via the interface device, a storage device for storing range information indicating an allowable range for voice volumes, a determination device for determining, when voice-volume information for assigning a voice volume of the voice information received by the reception device is added to the voice information, if the voice volume assigned by the added voice-volume information is within the allowable range indicated by the range information, a changing device for changing the voice-volume information so that a reproduced voice volume is within the allowable range when the determination device has determined that the voice volume is not within the allowable range, and a reproducing device for reproducing the voice information received by the reception device based on the voice-volume information changed by the changing device.

According to still another aspect, the present invention which achieves these objectives relates to a method for operating an electronic mail apparatus, including the steps of receiving a character string via an interface device for connecting the apparatus to a network, determining, when character-size information for assigning a character size is added to the character string received in the receiving step, if the character size assigned by the added character-size information is within an allowable range for character sizes indicated by range information stored in a storage device, changing the character-size information into information for assigning a character size within the allowable range when the determining step has determined that the character size is not within the allowable range, and displaying the character string received in the receiving step based on the character-size information changed in the changing step.

According to still another aspect, the present invention which achieves these objectives relates to a method for operating an electronic mail apparatus, including the steps of receiving voice information via an interface device for connecting the apparatus to a network, determining, when voice-volume information for assigning a voice volume of the voice information is added to the voice information received in the receiving step, if the voice volume assigned by the added voice-volume information is within an allowable range for voice volumes indicated by range information stored in a storage device, changing the voice-volume information so that a reproduced voice volume is within the allowable range when the determining step has determined that the voice volume is not within the allowable range, and reproducing the voice information received in the receiving step based on the voice-volume information changed in the changing step.

According to still another aspect, the present invention which achieves these objectives relates to a storage medium for storing a computer program. The computer program includes a receiving module including programming for the step of receiving a character string via an interface device for connecting an apparatus to a network, a determining module including programming for the step of determining, when character-size information for assigning a character size is added to the character string received in the receiving step, if the character size assigned by the added character-size information is within an allowable range for character sizes indicated by range information stored in a storage device, a changing module including programming for the step of changing the character-size information into information for assigning a character size within the allowable range when the determining step has determined that the character size is not within the allowable range, and a display module including programming for the step of displaying the character string received in the receiving step based on the character-size information changed in the changing step.

According to still another aspect, the present invention which achieves these objectives relates to a storage medium for storing a computer program. The computer program includes a receiving module including programming for the step of receiving voice information via an interface device for connecting an apparatus to a network, a determining module including programming for the step of determining, when voice-volume information for assigning a voice volume of the voice information is added to the voice information received in the receiving step, if the voice volume assigned by the added voice-volume information is within an allowable range for voice volumes indicated by range information stored in a storage device, a changing module including programming for the step of changing the voice-volume information so that a reproduced voice volume is within the allowable range when the determining step of the determining module has determined that the voice volume is not within the allowable range, and a reproducing module including programming for the step of reproducing the voice information received in the receiving step of the receiving module based on the voice-volume information changed in the changing step of the changing module.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 1 is a block diagram illustrating the system configuration of an electronic mail apparatus according to a first embodiment of the present invention;

FIG. 2 is a diagram illustrating font information and information relating to the size of a window in the first embodiment;

FIG. 4 is a diagram illustrating mail data shown in the form of a text in the first embodiment;

DETAILED DESCRIPTION OF THE PREFERRED EMBODIMENTS

Figure 3:
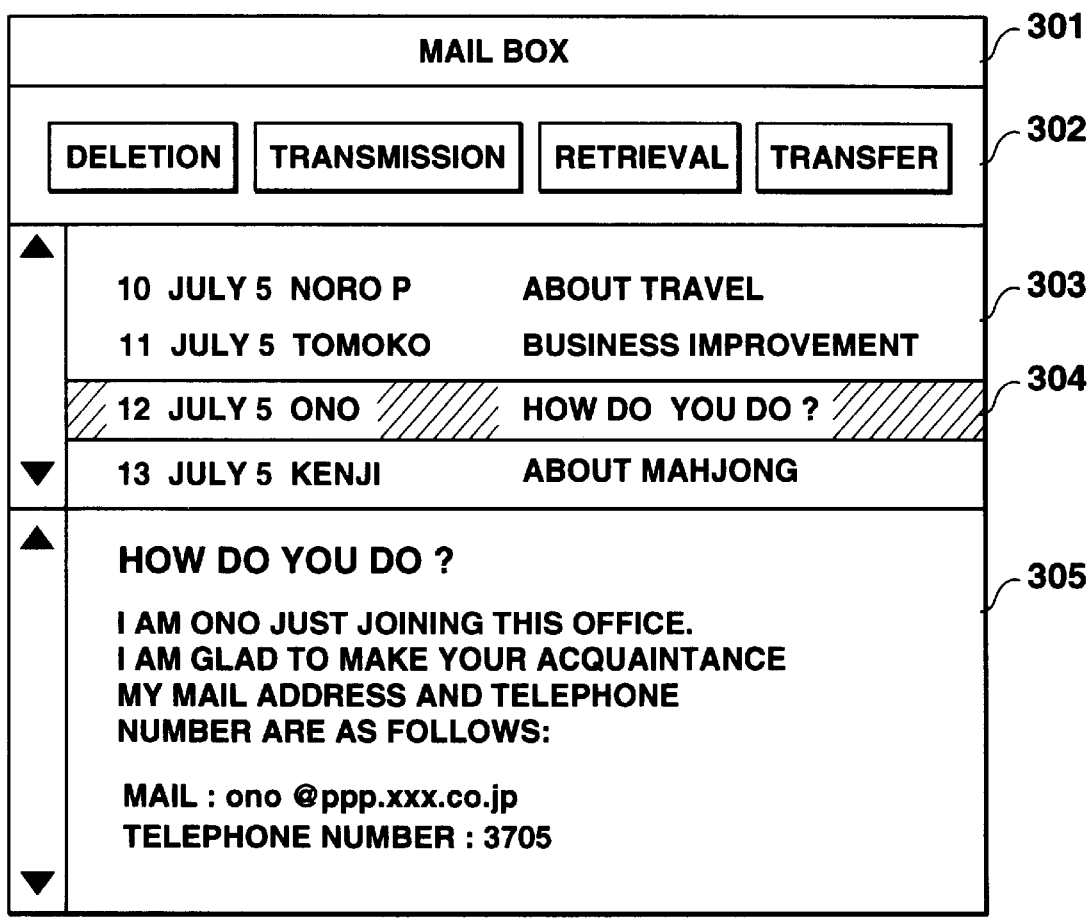
FIG. 3 is a diagram illustrating a display picture surface of an actual mail message in the first embodiment.

The preferred embodiments of the present invention will now be described in detail with reference to the drawings.
First Embodiment FIG. 1 illustrates the system configuration of an electronic mail apparatus according to a first embodiment of the present invention. In the first embodiment, a general-purpose personal computer or a work station can be used. In FIG. 1, an input device 101 includes a mouse and a keyboard, each of which operates as an information input device. A central processing unit 102 controls the entire system and electronic mail communication. A main storage device 103 stores input/output information relative to the central processing unit 102, and programs to be executed by the central processing unit 102.

A display device 104 comprises a CRT (cathode-ray tube) or the like. Reference numeral 105 represents a large-capacity secondary storage device comprising, for example, hard disks. The secondary storage device 105 stores well-known data used for converting a plurality of fonts having different character sizes, i.e., character codes, into dot patterns for display, and received mails and mails to be transmitted in the form of a data base. Reference numeral 106 represents a printer serving as an output device. A network interface 107 is connected to a network when performing electronic mail communication in order to transmit/receive a mail to/from a communication partner.

FIG. 2 illustrates a table stored in the secondary storage device 105.

In FIG. 2, the received mail is displayed within a range of a minimum font size 201 and a maximum font size 202. Reference numerals 203 and 204 represent the height and the width, respectively, of a window where the received mail is displayed. The size of characters of the displayed mail depends, in some cases, on this size. Reference numeral 205 represents the typeface of a standard font used in display.

In the first embodiment, the minimum font size 201 is set in accordance with the receiver's visual acuity. When displaying the text and additional data of a mail on the display device 104, a font proportionally calculated from the minimum font size 201 is used. The maximum font size 202 is set in order to prevent the use of an unnecessarily large font.

Next, a description will be provided of the state and the data form of a mail message which uses a free-size font in the MIME form with reference to FIG. 3. In FIG. 3, reference numeral 301 represents a typical window of the electronic mail apparatus. Main functions of the electronic mail apparatus are realized in this window. Reference numeral 302 represents an area where buttons each capable of issuing a command for controlling a mail message are arranged. Reference numeral 303 represents a summary area for displaying the title, the transmitter, the date and the like of each received mail. A highlighted portion 304 in the area 303 represents the mail message currently being displayed in a mail-text display area 305. When selecting a mail message to be read, a corresponding line within the summary area 303 is assigned using a pointing device, such as a mouse or the like. It will be understood from FIG. 3 that in order to provide better presentation, various font sizes are used within the main-text display area 305.

FIG. 4 illustrates the form of data displayed on the mail-text display area 305. A header portion 401 of the document includes various kinds of information, such as the form of the document, the size of the window, margins, the form and the sizes of the used fonts, and the like. Reference numeral 402 represents the name of the font to be used. Reference numeral 403 represents the size of the font. A character string "fs36" indicates that a 18-point font is used. Reference numeral 404 also represents the sizes of the fonts indicating that 10-point and 14-point fonts are used. Headers 404 and 405 are added when the font size in the document is changed from the foregoing sentence.

Figure 5:
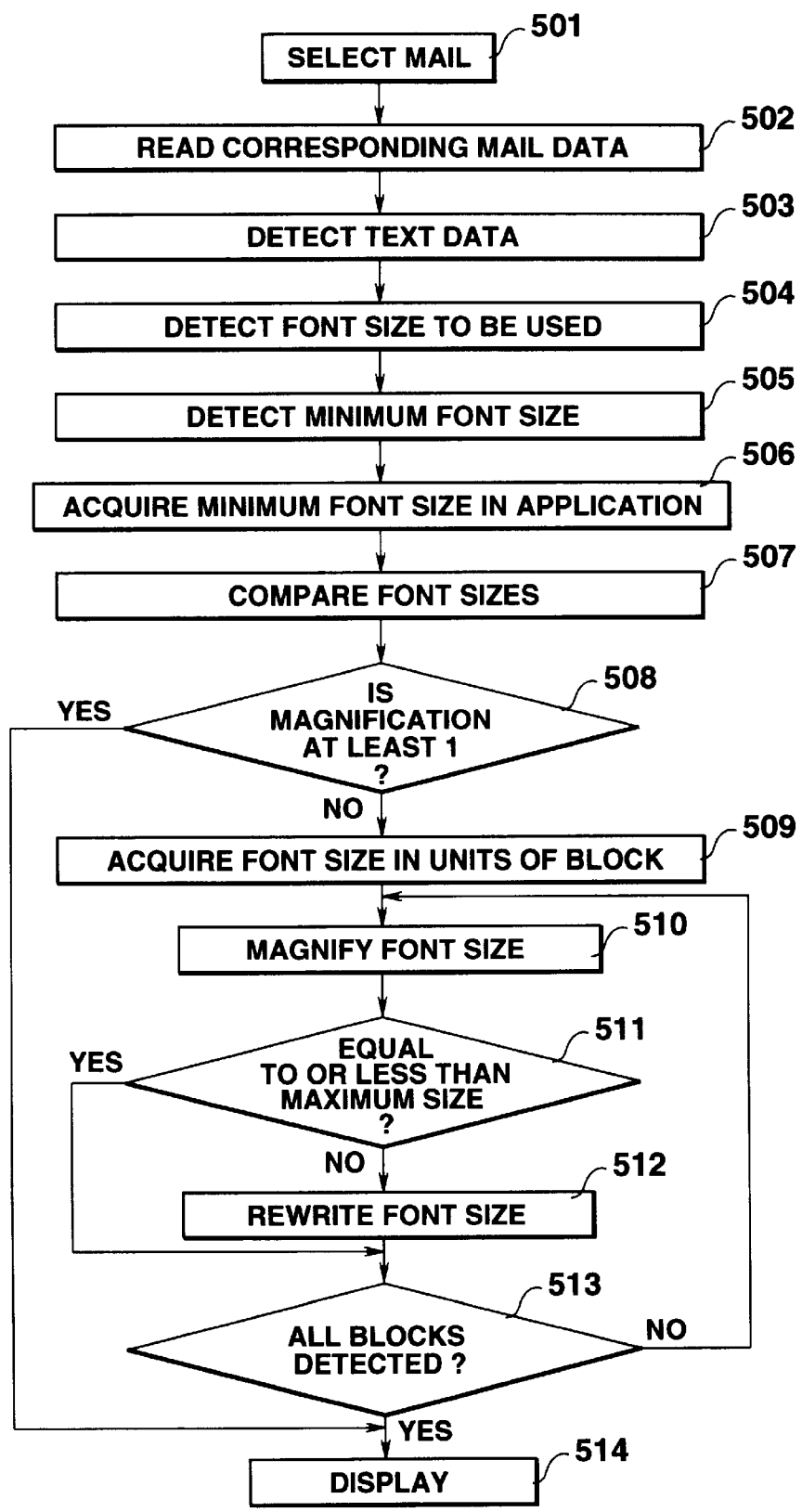
FIG. 5 is a flowchart illustrating the contents of processing in the first embodiment.

FIG. 5 is a flowchart illustrating the procedures of processing for changing the font size in the received mail message, which processing is a feature of the first embodiment. The processing procedures are stored in the main storage device 103, and are executed by the central processing unit 102. In FIG. 5, in step 501, the mail message to be displayed is selected. That is, the corresponding line is selected from the summary area 304 shown in FIG. 3. Then, in step 502, the corresponding mail data is read from the data base within the secondary storage device 105. Conventionally, the read data is displayed, and reading of one mail message is terminated. In the first embodiment, however, in step 503, the text portion in the read data is recognized based on a predetermined format. Then, in step 504, the value relating to the font size is particularly recognized. More specifically, the central processing unit 102 acquires values corresponding to the font sizes 403, 404 and 405 shown in FIG. 4, and stores the acquired values in the main storage device 103.

Then, in step 505, the minimum font size is extracted after recognizing all font-size data. In step 506, the minumum font size set in this mail application is acquired. In step 507, the minimum font size in the mail data is compared with the set font size. If the minimum font size in the mail data is larger than the minimum font size set in the table, i.e., the value 201 shown in FIG. 2, as the result of the comparison, display using the font size assigned by the main data is performed (the process proceeds from step 508 to step 514).

On the other hand, if the font size of the mail data is smaller than the set font data, i.e., the ratio of the two data is less than 1, this indicates that the received mail is difficult to observe for the user. Accordingly, in step 508, the ratio of the two minimum font sizes, i.e., magnification, is obtained and stored in the main storage device 103. In step 509, the recognition of data relating to the font size is again performed in units of a portion where the font size changes. That is, in the case of FIG. 4, the data 403 is first recognized, and then the data 404 and 405 are recognized. In the next step 510, the value of the data 403 is multiplied by the magnification obtained in step 508 to rewrite the value to the result of the multiplication. For example, suppose that the minimum font size set in the table is 12 points, and the minimum font size described in the mail message shown in FIG. 4 is 10 points (the size 404). The magnification is 12÷10=1.2, and the value of the data 403 is 36×1.2=43. As a result, the data 403 is rewritten to fs43 indicating that a display of 21.5 points is expected. Then, in step 511, it is determined if the font size magnified in step 510 is equal to or less the maximum font size set in the table. If the result of the determination is affirmative, the data of the font size is not rewritten (the process proceeds from step 511 to step 513). If the result of the determination in step 511 is negative, the process proceeds to step 512, where the data is rewritten to the maximum font size 202 set in the table shown in FIG. 2. In determination processing in step 513, it is determined if the above-described processing has been performed for all data relating to the font size described in the mail message, i.e., if the processing procedures have been terminated. Upon completion of rewriting processing, the process proceeds to step 514, where the mail is displayed.

By executing the above-described processing procedures, if characters of a font size smaller than the minimum font size set in the table are present within the mail message, the font size of these characters is changed to a font size equal to or larger than the minimum font size. At the same time, a font size larger than the minimum font size within the mail message is magnified by the same magnification as that for the changed font size. As a result, a mail message having a small font can be seen as if it has been magnified while maintaining the relative balance between different character sizes.

A modification of the first embodiment will now be described.

Figure 6:
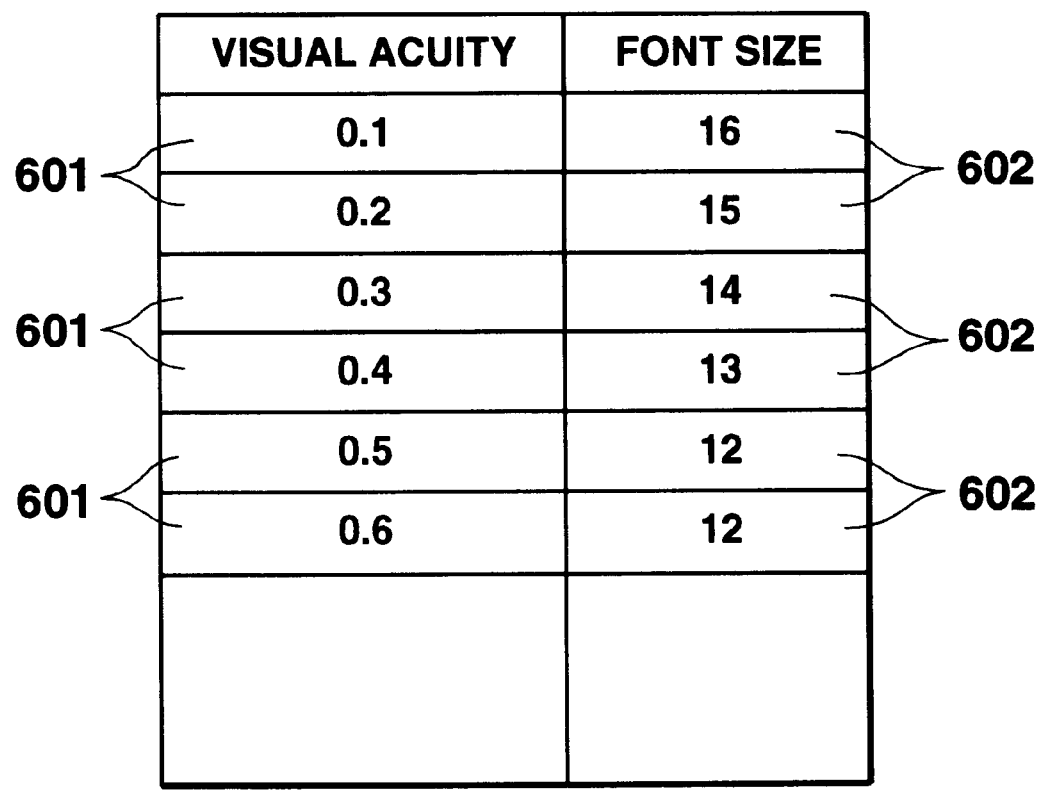
FIG. 6 is a diagram illustrating the relationship between the visual acuity and the font size.

In order to enter values in a table as that shown in FIG. 2, the user inputs the character sizes 201–204 using numerical values (point numbers). However, since the point number of a given font is generally a numeral unfamiliar to the user, it is necessary to perform the process of setting a character size→displaying→changing the character size with a trial-and-error approach. In this modification, the user can determine the point number for display by inputting the level of the user's own visual acuity. For that purpose, for example, a table illustrating correspondence between visual acuity and the font size shown in FIG. 6 is stored. In FIG. 6, reference numeral 601 represents visual acuity. Reference numeral 602 represents the font size. By inputting the user's visual acuity corresponding to the minimum font size registered for the user (see FIG. 2), the central processing unit 102 can acquire the minimum font size to be registered in accordance with the correspondence table shown in FIG. 6.

Second Embodiment

As described above, transmission/reception of voice information is performed in recent electronic mail systems. A computer for transmitting/receiving mail has a sound function, so that the sound volume can be controlled by software. Usually, the user manually sets the sound volume using a value according to general representation, such as high, medium and low. If the user intends to increase the reproduced volume when voice is included in an electronic mail message, it is necessary to increase the volume from the value held in the computer.

Figure 7:
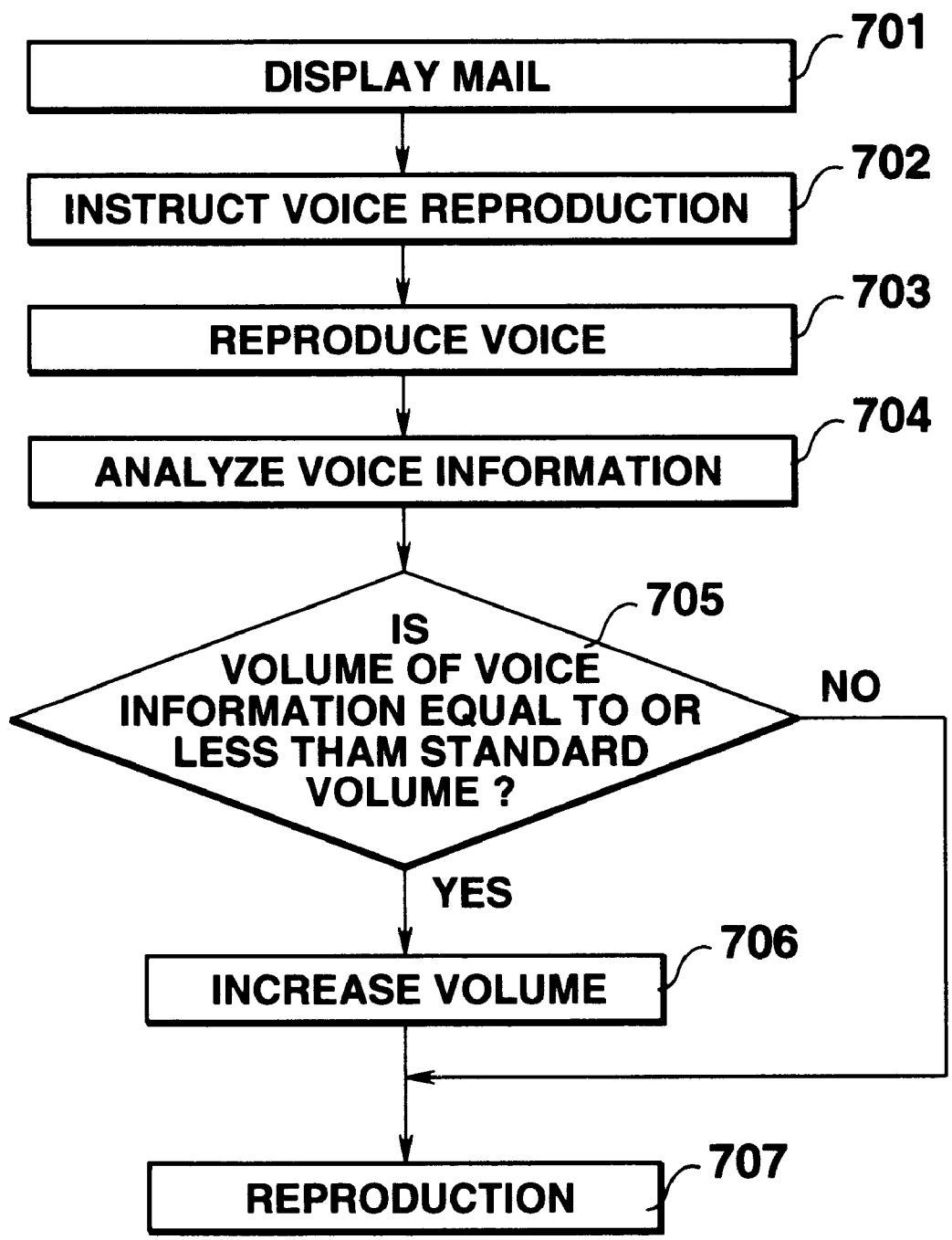
FIG. 7 is a flowchart illustrating a method for reproducing voice data according to a second embodiment of the present invention.

A description will now be provided of a second embodiment of the present invention which realizes such a function with reference to the flowchart shown in FIG. 7. The same system configuration as that shown in FIG. 1 may be adopted for the second embodiment, except that a voice output device, such as a speaker or the like, is included in the output device 106. The processing procedures of FIG. 7 start from a state in step 701 in which the received mail is displayed. If voice data is added to the mail message, graphics, such as an icon or the like, indicating the fact is displayed on the mail message on the display picture surface. If the graphic is assigned in step 702, the process proceeds to step 703, where voice information is extracted from the mail message stored in the secondary storage device 105. The processing up to this point is the same as in the conventional approach, and voice is not actually output. The process then proceeds to step 704, where the voice information is analyzed to evaluate the voice volume. If a voice volume lower than the lower limit value indicated by a preset allowable range (expressed by the upper and lower limit values) is assigned in the voice information of the mail as a result of determination in step 705, the process proceeds to step 706, where the central processing unit 102 increases the volume of voice output from the voice output device to the lower limit value of the allowable range. Then, the read voice information is reproduced (step 707). Thus, the operator can hear the mail message with a higher voice volume.

A standard volume may be input in advance from the input device 101, and the central processing unit 102 may store the standard volume in the secondary storage device 105. If the volume assigned by the mail message is larger than the allowable range, the volume of the reproduced voice may be reduced in a manner similar to that as when increasing the voice volume.

Other Embodiments

The following embodiments of the present invention may be executed in addition to the above-described first and second embodiments.

1) The electronic mail apparatus described in the first and second embodiments may comprise a single apparatus. Furthermore, an electronic mail apparatus can be realized according to software by mounting application programs having the contents of the processing shown in FIGS. 5 and 7 in a general-purpose computer.

2) Electronic-mail communication can be performed on a large-scale network via a LAN (local area network) to which a plurality of computers are connected, or a public telephone line.

3) The method for changing the size of displayed characters differs depending on the form of the character font. Since a font called a bit-map font has a dot pattern corresponding to a character code, displayed characters cannot be magnified. Accordingly, bit-map fonts of a plurality of kinds of sizes, such as 8, 10, 12, . . . points, are stored in the secondary storage device 105. When a character size to which characters are to be magnified is obtained, a bit-map font equal to or close to the obtained size may be read from the secondary storage device 105 and may be used for displaying the mail.

In a font called a vector font or an outline font, a character is represented by contour lines and characteristic points and can be reduced or magnified. By preparing such a font, characters may be magnified when generating character patterns to be displayed.

4) Although in the first and second embodiments only magnification of characters has been described, characters may be reduced/magnified in accordance with the size of the display picture surface of the display device.

It is also possible to variably set the size of displayed characters in accordance with the size of the display picture surface of the display device being used. In this case, correspondence between the size of the display picture surface and the allowable range (character sizes at the upper limit and the lower limit) is determined, and the allowable range is derived from the size of the display picture surface based on such correspondence. Since the size of the display picture surface is registered as system information within the computer, the registered data may be used.

As described above, according to the first embodiment, by changing a character size assigned by a mail message so as to be within an allowable range which has been stored in advance, the size of characters of the mail message on the display picture surface becomes easy to observe for the user.

If characters in a mail message have a plurality of character sizes, it is only necessary to compare the minimum size with the allowable range, so that time required for comparison can be shortened.

If the minimum size of characters in a mail message is smaller than the allowable range, the sizes of all characters used in the mail message are magnified, so that balance among characters having different sizes is the same as balance among original characters.

It is also possible to automatically set the magnification value using a character size assigned by a mail message, so that the user need not manually input the magnification value.

It is also possible to set the allowable range for character sizes to a range desired by the user.

Since the user can register the allowable range for character sizes in the form of visual-acuity information, even a user unfamiliar with computers can easily operate the apparatus.

According to the second embodiment, when reproducing voice information added to a mail message, the volume of reproduced voice can be changed within a range suitable for the user.

The individual components designated by blocks in the drawings are all well-known in the electronic mail apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic mail apparatus comprising:

an interface for connecting said apparatus to a network;

a receiver for receiving a character string via said interface;

a memory for storing range information indicating an allowable range for character sizes including a plurality of different sizes;

determination means for determining, when character-size information for assigning a plurality of different character sizes is added to the character string received by said receiver, whether the character sizes assigned by the added character-size information are within the allowable range indicated by the range information;

changing means for changing the character-size information into information for assigning a plurality of different character sizes within the allowable range when said determination means has determined that the character sizes are not within the allowable range; and a display for displaying the character string received by said receiver based on the character-size information changed by said changing means.

2. An electronic mail apparatus according to claim 1, wherein, when characters of a plurality of different character sizes are used in the character string, said determination means detects a minimum character size in the character string, and compares the detected minimum character size with a lower-limit size of the allowable range.

3. An electronic mail apparatus according to claim 2, wherein, when said determination means has determined that the minimum character size in the character string is smaller than the lower-limit size of the allowable range, said changing means changes character-size information for the characters of the plurality of different character sizes into information for assigning character sizes magnified with a predetermined magnification.

4. An electronic mail apparatus according to claim 3, wherein the predetermined magnification is a value obtained by comparison between the minimum character size in the character string and the lower-limit size of the allowable range.

5. An electronic mail apparatus according to claim 1, further comprising registration means for registering the range information in said memory.

6. An electronic mail apparatus according to claim 5, further comprising:

input means for inputting visual-acuity information; and correspondence storage means for storing correspondence between visual-acuity information and character sizes, wherein said registration means registers the input visual-acuity information in said storage means by converting the input visual-acuity information into a character size in accordance with the correspondence.

7. A method for operating an electronic mail apparatus, said method comprising the steps of:

receiving a character string via interface means for connecting the apparatus to a network;

determining, when character-size information for assigning a plurality of character sizes is added to the character string received in said receiving step, whether the character sizes assigned by the added character-size information are within an allowable range for character sizes indicated by range information stored in storage means;

changing the character size information into information for assigning a plurality of different character sizes within the allowable range when said determining step has determined that the character sizes are not within the allowable range; and displaying the character string received in said receiving step based on the character size information changed in said changing step.

8. A method according to claim 7, wherein, when characters of a plurality of different character sizes are used in the character string, said determining step detects a minimum character size in the character string, and compares the detected minimum character size with a lower-limit size of the allowable range.

9. A method according to claim 8, wherein, when said determining step has determined that the minimum character size in the character string is smaller than the lower-limit size of the allowable range, said changing step changes character-size information for the characters of the plurality of different character sizes into information for assigning character sizes magnified with a predetermined magnification.

10. A method according to claim 9, wherein the predetermined magnification is a value obtained by comparison between the minimum character size in the character string and the lower-limit size of the allowable range.

11. A method according to claim 7, further comprising the step of registering the range information in the storage means.

12. A method according to claim 11, further comprising the step of inputting visual-acuity information, wherein said regisering step registers the input visual-acuity information in the storage means by converting the input visual-acuity information into a character size in accordance with correspondence between visual-acuity information and character sizes stored in a correspondence storage means.

13. A storage medium storing a computer program, said computer program comprising:

a receiving module for a step of receiving a character string via interface mans for connecting an apparatus to a network;

a determining module for a step of determining, when character-size information for assigning a plurality of character sizes is added to the character string received in said receiving step, whether the character sizes assigned by the added character-size information are within an allowable range for a plurality of character sizes indicated by range information stored in storage means;

a changing module for a step of changing the character-size information into information for assigning a plurality of character sizes with the allowable range when said determining step has determined that the character sizes are not within the allowable range; and a displaying module for a step of displaying the character string received in said receiving step based on the character size information changed in said changing step.

14. A storage medium according to claim 13, wherein, when characters of a plurality of different character sizes are used in the character string, said determining step of said determining module detects a minimum character size in the character string, and compares the detected minimum character size with a lower-limit size of the allowable range.

15. A storage medium according to claim 14, wherein, when said determining step of said determining module has determined that the minimum character size in the character string is smaller than the lower-limit size of the allowable range, said changing step of said changing module changes character-size information for the characters of the plurality of different character sizes into information for assigning character sizes magnified with a predetermined magnification.

16. A storage medium according to claim 15, wherein the predetermined magnification is a value obtained by comparison between the minimum character size in the character string and the lower-limit size of the allowable range.

17. A storage medium according to claim 13, further comprising a registering module for a step of registering the range information in the storage means.

18. A storage medium according to claim 17, further comprising an inputting module for a step of inputting visual-acuity information, wherein said regisering step of said registering module registers the input visual-acuity information in the storage means by converting the input visual-acuity information into a character size in accordance with correspondence between visual-acuity information and character sizes stored in correspondence storage means.

19. An electronic mail apparatus according to claim 3, wherein said determination means determines, when the character-sizes are magnified with the predetermined magnification, whether the magnified character-sizes exceed the allowable range; and said changing means changes, when said determination means has determined that the magnified character-sizes exceed the allowable range, the character-sizes determined to exceed the allowable range into the upper-limit size of the allowable range.

20. A method according to claim 9, wherein said determining step determines, when the character-sizes are magnified with the predetermined magnification, whether the magnified character-sizes exceed the allowable range; and said changing step changes, when said determining step has determined that the magnified character-sizes exceed the allowable range, the character-sizes determined to exceed the allowable range into the upper-limit size of the allowable range.

21. A storage medium according to claim 15, wherein said determining step determines, when the character-sizes are magnified with the predetermined magnification, whether the magnified character-sizes exceed the allowable range; and said changing step changes, when said determining step has determined that the magnified character-sizes exceed the allowable range, the character-sizes determined to exceed the allowable range into the upper-limit size of the allowable range.

* * * * *